Sept. 15, 1959
C. TOPPING
2,904,228
SPLITTING STREAMS OF PARTICULATE SOLIDS
Filed Dec. 23, 1957
3 Sheets-Sheet 1
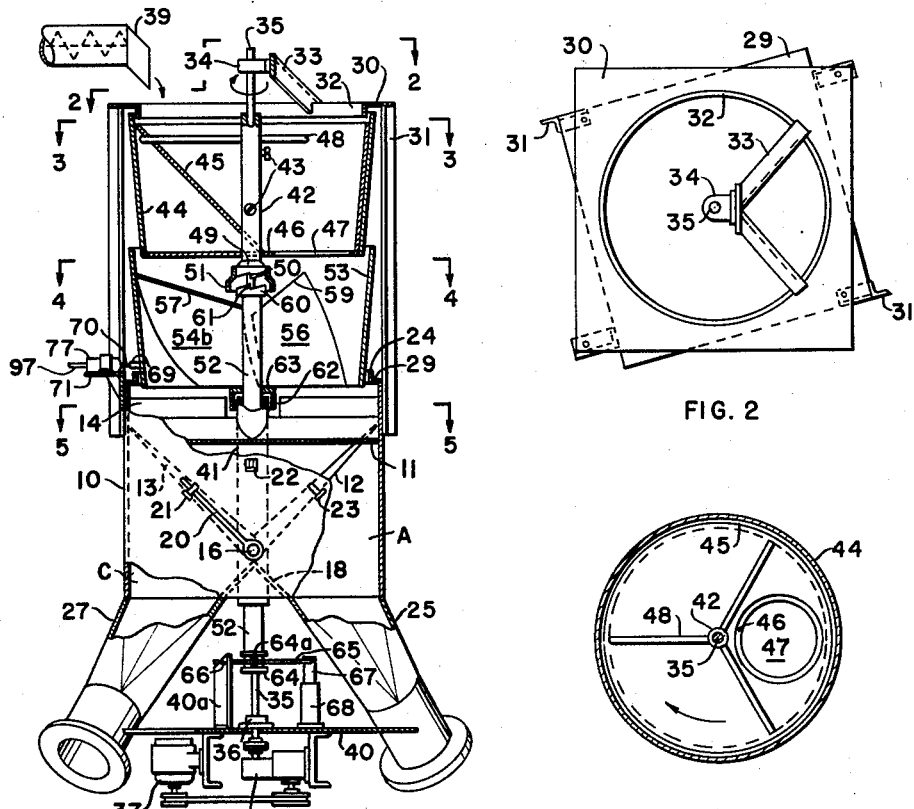
FIG. 1
FIG. 2
FIG. 3
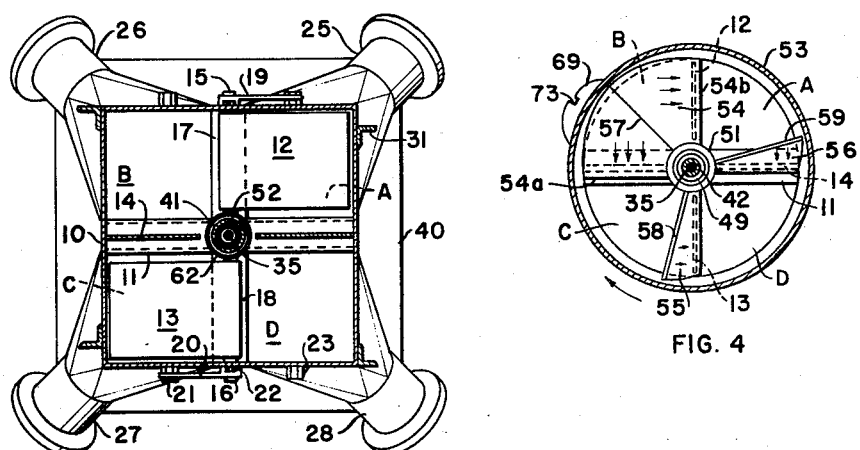
FIG. 5
FIG. 4
INVENTOR:
CUTHBERT TOPPING
BY
HIS ATTORNEY Sept. 15, 1959 C. TOPPING 2,904,228
SPLITTING STREAMS OF PARTICULATE SOLIDS
Filed Dec. 23, 1957 3 Sheets-Sheet 2

INVENTOR
CUTHBERT TOPPING
BY Oswald H. Milmore
HIS ATTORNEY

INVENTOR
CUTHBERT TOPPING
BY Oswald H. Milmore
HIS ATTORNEY

United States Patent Office 2,904,228
Patented Sept. 15, 1959

2,904,228
SPLITTING STREAMS OF PARTICULATE SOLIDS

Cuthbert Topping, Concord, Calif., assignor to Shell Development Company, New York, N.Y., a corporation of Delaware Application December 23, 1957, Serial No. 704,712

19 Claims. (Cl. 222—330)

The invention relates to apparatus for splitting a feed stream of granular solids into a plurality of discharge streams having a fixed size-relation, and further to a device for selectively varying the number of the discharge streams.

The invention may be applied to a wide variety of solids, such as salt, grain, sand, and catalyst particles. For example, in the processing of ammonium sulphate crystals a composite feed stream is subdivided into several fractional streams each of which is passed through a screening unit prior to flowing the crystals into shipping containers. It was found to be desirable to maintain the mass flows of the fractional streams in a fixed proportion, e.g., equal, despite variations in the mass flow of the feed stream. Moreover, when it is necessary to take one or more of the screening units out of service for cleaning or maintenance, it is desirable that all of the solids be divided in fixed proportion among the streams that continue to flow.

Difficulties have been encountered in achieving such a splitting of a stream by the use of such simple expedients as discharging the fractional streams through individual outlets of a bin or feed hopper, due to the tendency of solids to flow unevenly despite a multi-lateral arrangement of the flow paths. Thus, the solids follow unpredictable flow patterns when moving through a bin containing a continuous mass of solids. The difficulty is aggravated when it is sought to split the stream into a variable number of fractional streams or, at successive times, through a different partial group of a larger number of discharge ducts because this destroys the symmetry of the flow paths.

A further difficulty in prior devices is the necessity to interrupt the flow of solids while an adjustment is made to change the active discharge ducts. This is often inconvenient, as when solids are supplied continuously by a plant which it is desired to keep in operation.

It is, therefore, an object of the invention to provide an improved apparatus for achieving a uniform splitting of a stream of granular solids proportionally among a plurality of fractional streams.

A further object is to provide an apparatus whereby the feed stream can be split proportionally into a variable number of fractional streams or at successive times, into different selected groups of discharge ducts out of a larger number of ducts.

Still another object is to provide an improved apparatus wherein the number of active outlets and/or the group of active outlets can be changed rapidly and without interrupting the flow of solids in the production stream.

In summary, the apparatus according to the invention comprises a continuously rotating distributor having an eccentric outlet which distributes the feed stream of solids onto an adjustable splitter provided with a plurality of channels by which the solids stream is split into fractional streams and from which the latter flow into a plurality of hoppers which are advantageously more numerous than the splitter channels and are connected to separate discharge ducts.

In one mode of operation, wherein the splitter is stationary, the several channels of the splitter receive aliquot parts of the feed stream as the distributor distributes the solids at a constant rate along an annular path and the fractional streams from these channels flow into a selected group of the hoppers. The splitter may be adjusted in any position to prevent flow of solids into any one of the hoppers, so that the remaining hoppers receive proportional, e.g. equal, flow regardless of which hopper is out of service. The splitter may also be used to split the solids into as many fractional streams as there are hoppers; for this purpose either of two methods may be used: In the first, the splitter is set at an adjusted position so that at least two of the channels deliver solids to more than one hopper, the geometry of the channels being such that the hoppers receive proportional, e.g. equal, streams. In the second, the splitter is rotated continuously, e.g., at the same speed as the distributor and functions in effect as a second distributor which delivers the solids successively into the several hoppers.

According to a further feature the hoppers are provided with movable partitions which may be adjusted, e.g., by swinging, to deflect all of the solids which would normally be delivered into two adjoining hoppers into one of the two hoppers.

Having indicated the general nature of the invention, a detailed description will be made with reference to the accompanying drawing forming a part of this specification and showing certain preferred alternative embodiments, wherein:

Figure 1 is a vertical sectional view through the stream splitting machine, parts being shown in elevation;

Figure 2 is a plan view, as indicated by the broken line 2—2 of Figure 1;

Figures 3 and 5 are transverse sectional views taken on the correspondingly numbered lines of Figure 1;

Figure 6:
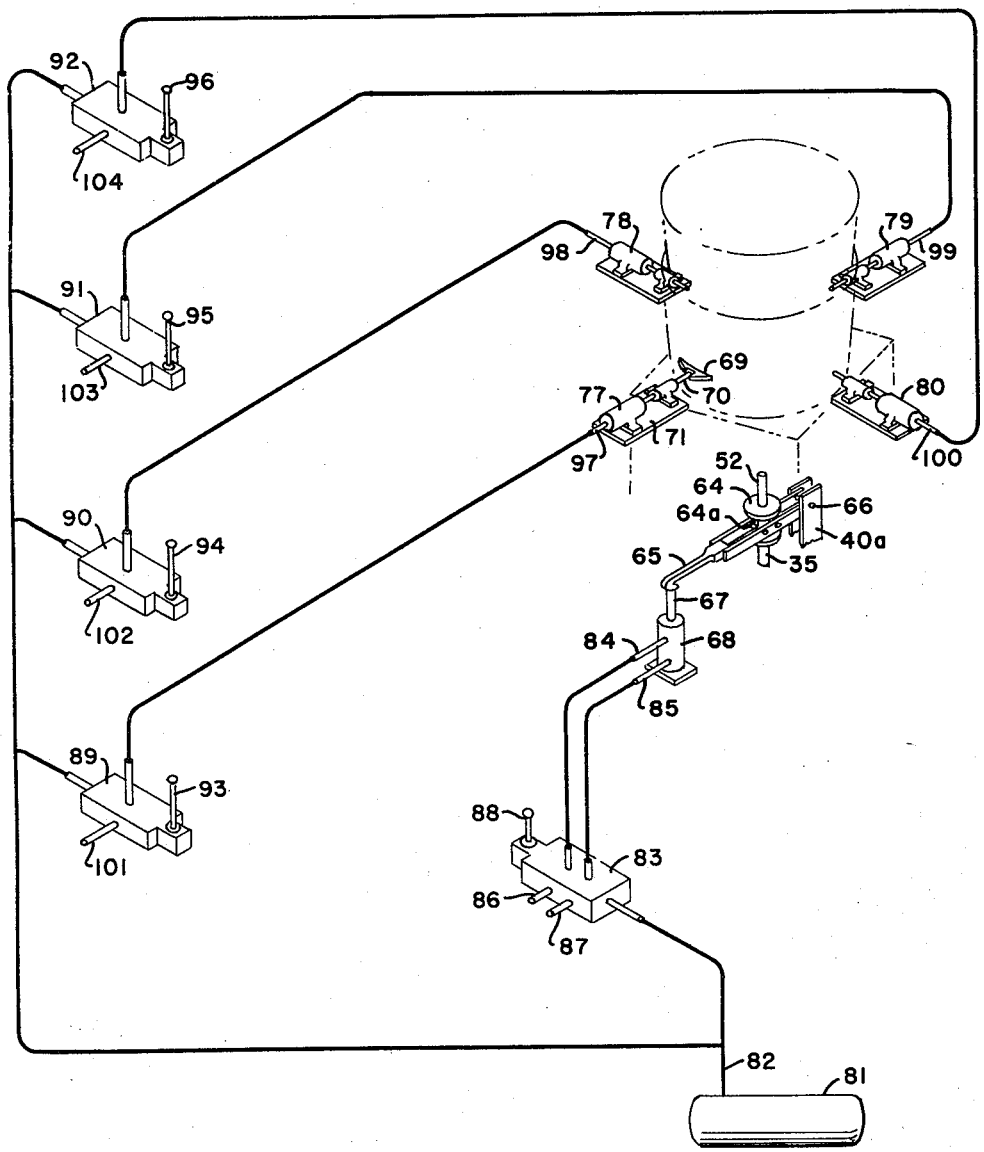
Figure 7:
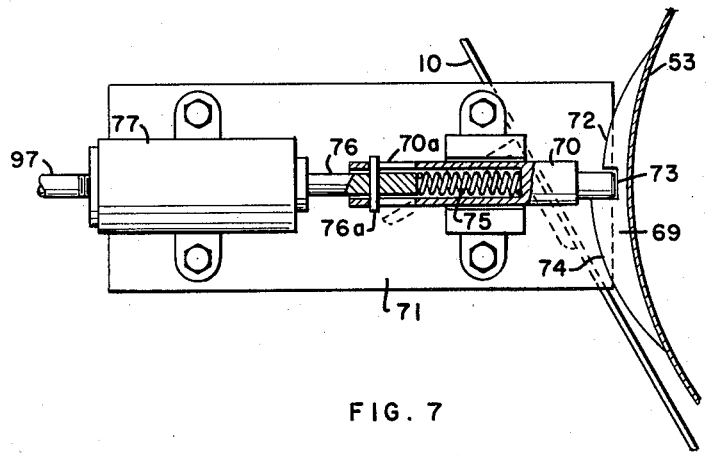
Figure 8:
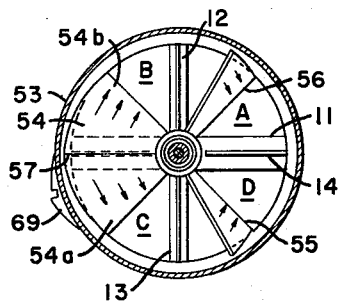
Figure 9:
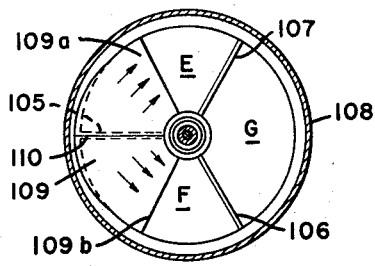
Figure 10:
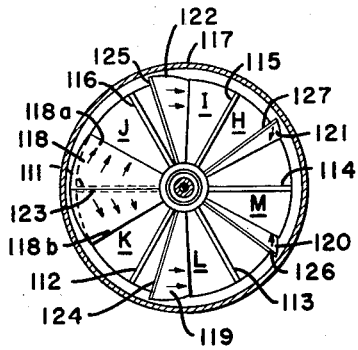

Figure 4 is a transverse sectional view taken on the line 4—4 of Figure 1 but with the walls 12 and 13 in vertical positions;

Figure 6 is an isometric view showing the pneumatic control system, the splitting machine proper being indicated in phantom;

Figure 7 is an enlarged plan view of one of the latching pins and the pin stop;

Figure 8 is a transverse sectional view corresponding to Figure 4 but showing the splitter in a different position; and Figures 9 and 10 are transverse sectional views corresponding to Figure 4 showing two alternative embodiments.

Referring to Figures 1–5 of the drawings, the splitting machine includes at the bottom a receiver or hopper box 10, square in plan and partitioned by a fixed, transverse double wall 11 and a pair of double pivoted walls 12 and 13 which are perpendicular to the wall 11 to quarter the box and to provide four hoppers A, B, C and D. The double wall 11 is surmounted by a single vertical wall 14 to define more sharply the boundaries between hoppers situated on either side thereof. The walls 12 and 13 have the side plates thereof joined along a narrow edge at the top and the spaced bottom parts thereof are fixed at the bottom to separate shafts 15 and 16, respectively, which are mounted above angle bars 17 and 18 and journalled in the partition wall 11 and in the outer walls of the box. Operating arms 19 and 20 are fixed to these shafts and cooperate with latches on the outside of the box. The arms are independently operable and each has a set of three latches, of which only the latches 21, 22 and 23 for the arm 20 are identified by reference numbers. When the arm is engaged with the central latch 22 the wall 13 is vertical and hoppers C and D are both open; when the arm is engaged with the latch 21, as shown in the drawing, the wall 13 is inclined over the hopper C, to deflect any solids falling into it into the hopper D; and when engaged with the latch 23 the wall is inclined over the hopper D to deflect solids into the hopper C. Each hopper is open at the bottom and communicates with a separate discharge duct 25, 26, 27 or 28. These discharge ducts are, in a preferred installation, fully open, so that the hoppers A, B, C and D are in reality the inlet ends of the ducts, through which the solids flow without hold-up or surge volume. The top of the hopper box is covered by a plate 29 having a large circular hole at the center to the margin of which a ring 24 is welded.

A square top plate 30 is supported in spaced relation above the plate 29 by posts 31 and has a ring 32 welded at the margin of a large circular hole therein. The top plate carries a framework 33 to which is attached a ball bearing pillow block 34 situated at the central vertical axis. A drive shaft 35 extends vertically through the block 34, the double wall 11, and a bottom thrust bearing 36 beneath the hopper box, and is coupled to a suitable drive mechanism, e.g., from an electrical motor 37 through a speed reducer 38. The thrust bearing is supported on a platform frame 40 suspended from hopper box. A tube 41, which is fixed within the wall 11, forms a well through which the shaft 35 and the splitter sleeve, described hereinafter, extend with clearance.

The feed stream of solids is supplied to the top of the splitting machine via a chute or duct 39 which may contain a conveyor screw, as is well known in the art. The several discharge ducts 25–28 may be connected to screening units, not shown.

A distributor is supported by the drive shaft in fixed relation near the top for rotation therewith. It includes a sleeve 42 fixed to the shaft by set screws 43; a slightly downwardly tapered drum 44 of circular, cross section the upper rim of which extends above the bottom of the ring 32 and outside thereof, an inclined floor 45 consisting of a frusto-conical funnel-like insert which may optionally be joined to a horizontal floor 46 having a circular bottom outlet opening 47, the floor being joined to the drum and the sleeve; and radial supporting arms 48 extending from the upper part of the sleeve. The bottom of the sleeve carries drive coupling 49 for driving the splitter, to be described, and forming a part of a clutch mechanism. The coupling 49 has a downwardly directed, inclined annular surface and a shoulder 50. A dust shield 51 is secured to the coupling.

The rotatable splitter is mounted just below the distributor and includes a central sleeve 52 surrounding the drive shaft; a slightly downwardly tapered drum 53 of circular cross section, the upper rim of which extends above the bottom of the drum 44 in surrounding relation thereto and the lower rim of which extends into the ring 24 and the central hole in the plate 29; and three substantially sector-shaped, circumferentially inclined walls 54, 55 and 56 extending between the sleeve and drum and supporting the latter. Downward slopes are indicated by small arrows in Figure 4. The wall 54 includes two parts, 54a, 54b, sloping downwards in opposite circumferential directions from a radial ridge 57 and the vertical projection of each part occupies a sector of slightly greater than 45°, i.e., the wall as a whole extends through slightly more than 90°, so that the lowermost edges can overlie two circumferentially adjacent hopper partition walls as shown in Figure 4. The vertical projections of the walls 55 and 56 each extend for slightly more than 15° and their upper edges 58 and 59 are displaced 120° from the ridge 57 in the counter-clockwise and clockwise directions, respectively. The splitter therefore provides three gravity-flow channels. Each channel has an inlet at the top extending circumferentially through an arc of 120° as follows: The first inlet extends clockwise from the ridge 57 to the edge 59; the second between the edges 59 and 58; and the third from the edge 58 to the ridge 57. Each channel has a sectorially restricted bottom outlet in that the areas occupied by the three plates prevent the vertical passage of material over the sectors occupied by the plates.

The splitter sleeve 52 is vertically slidable and rotatable with respect to the shaft 35. It carries at the top a drive coupling 60 having an upwardly directed, inclined annular surface and a shoulder 61 for engagement with the shoulder 50 of the coupling 49. A collar-shaped dust shield 62 is fixed to the sleeve immediately beneath the walls 54–56 by a stop-ring 63, and has a diameter large enough to surround the tube 41 to prevent solids from entering the tube. When the sleeve is in its lower position, as shown in Figure 1 with the coupling 60 disengaged from the coupling 49, the ring 63 is near to but spaced from the tube 41, as shown. The shield 62 is long enough to extend below the top of the tube 41 when the splitter is raised to engage the couplings. The bottom of the sleeve carries a double shift collar 64 which is engaged by anti-friction rollers 64a on a shift lever 65. The latter is pivotally mounted at 66 on a standard 40a which is mounted on the frame 40 and has a pivoted connection to the piston rod 67 of a fluid pressure-actuated motor, such as a pneumatic, two-stroke cylinder 68. It is apparent that the splitter can be raised and lowered through the lever 65 and collar 64 by means of the pneumatic cylinder.

The splitter is provided with means to latch it in any one of several oriented positions in which the ridge 57 lies above the diagonal of one of the hoppers, so that the selected hopper is completely covered by the wall 54. In the embodiment shown these means include a cam-shaped, latch-pin stop 69 (Figures 1, 6 and 7) fixed to the outside of the splitter drum 53 and cooperating with four radial, spring-loaded latch pins 70 which are reciprocably mounted on brackets 71 on the sides of the posts 31 in positions distributed 90° apart about the central axis. The stop 69 has an approach cam surface 72, a notch 73 and a retreating cam surface 74, it being noted that the direction of rotation is clockwise when viewed in plan. The stop 69 has a limited vertical dimension, so as to engage the pins 70 only when the splitter is in its lower position. Each pin has at the rear end thereof a well containing a spring 75 and the end portion of the operating rod of a fluid pressure-actuated motor. This may be the piston rod 76 of a pneumatic, single-stroke latching cylinder 77, 78, 79 or 80. Each cylinder contains a spring (not shown) for retracting the piston rod when no air pressure is applied. A pin 76a extends transversely through each rod 76 and has a sliding fit within a longitudinal slot 70a in the pin 70. The end of the rod abuts the spring 75, and the spring urges the rod and pin to the relative positions shown in Figure 7.

The pins 70 are normally retracted by the rods 76 and pins 76a due to the action of the internal cylinder springs. When pressurized air is admitted to a selected cylinder, e.g., via the duct 97, its piston rod and latch pin 70 are projected so that the end of the latter extends into the path of the latch pin stop 69. The cam surface 72 forces the pin inward against its spring 75 until the end of the pin enters the notch 73; this arrests the rotation of the splitter and latches it in the selected orientation.

The control system for operating the pneumatic cylinders is shown in Figure 6. It includes a source of compressed air, represented by the tank 81, which discharges into a manifold pipe 82. One branch supplies air to a double valve 83 provided with a pair of pressure ducts 84 and 85 which are connected respectively to the top and bottom of the cylinder 68, a pair of vents 86 and 87, and an operating lever 88. When the lever is in one position air from the manifold 82 is admitted via duct 85 to the bottom of the cylinder, thereby moving its rod 67 up and raising the splitter to engage the couplings 49 and 60; air is then vented from the top of the cylinder through the duct 84 and vent 86. In the other position of the lever air from the manifold flows into the top of the cylinder through the duct 84, thereby lowering the splitter, and air is vented from the bottom of the cylinder through the duct 85 and vent 87. In both positions the splitter is supported by its collar 64 from the rollers 64a. Additional manifold branches supply air to single valves 89–92 which have operating levers 93–96, are connected by pressure ducts 97–100 to the cylinders 77–80, respectively, and have vents 101–104. Each lever in one position thereof admits air through its pressure duct to the corresponding cylinder to project the latch-pin 70 and in its other position thereof vents air from the duc to cause the pin to be retracted.

In operation, to distribute the solids equally among the four discharge ducts 25–28, the operating arms 19 and 20 are latched in the vertical positions by the latches 22 to position the walls 12 and 13 vertically and open all four hoppers A, B, C and D. The valve lever 88 is moved to admit compressed air via the pressure duct 85 to the bottom of the cylinder 68, thereby actuating the shift lever 65 to raise the splitter sleeve 52 and engage its drive coupling 60 with the coupling 49 on the distributor. The motor 37 is operated to rotate the shaft 35 and, thereby, the distributor and splitter, which rotate in unison at a uniform speed. The couplings 49 and 60 can be oriented on their sleeves to establish any desired angular relation between the distributor and the splitter. According to a preferred arrangement they are oriented to engage the splitter with the bottom outlet opening 47 of the distributor centered in one of the large gaps between the walls 55 and 56. Solids supplied from the chute 39 slide down the inclined floor 45 of the distributor and drop through the eccentric distributor outlet opening 47; they fall thence through the large gap in the distributor into the hoppers. As the opening 47 passes successively over the hoppers and moves with constant velocity, the solids are distributed equally among the four hoppers, from which the solids flow without hold-up into the ducts 25–28.

To distribute the solids equally to only two discharge streams, the operation is as described above save that two hoppers are made inactive by operating the arms 19 and 20 in the desired directions to incline the walls 12 and 13. Thus one of the hoppers A or B and one of the hoppers C or D are rendered inactive, and the solids are divided into two equal streams as described above. Figures 1 and 5 of the drawing shows these walls inclined to feed all of the solids into the hoppers B and D.

To distribute the solids equally into three discharge streams, any selected one of the hoppers is placed out of operation by holding the splitter in a stationary position with the wall 54 over that hopper. Thus, as is shown in Figure 4, the wall 54 may be positioned to cover the hopper B. The partition walls 12 and 13 are again vertical. The positioning of the splitter is effected by operating the appropriate one of the levers 93–96 to project the corresponding latch-pin 70 and operating the lever 88 to vent air from the bottom of the cylinder 68 and admit compressed air into the top, thereby lowering the splitter. When the splitter coupling 60 is disengaged from the distributor it continues to rotate by inertia until the latch-pin stop 69 engages the projected pin 70, thereby latching it in the correctly oriented position. The solids flowing from the distributor bottom outlet 47 are now distributed equally into the three channels of the distributor since each channel has an inlet extending over 120° of arc. The solids flow by gravity through these three channels into the three active hoppers A, C and D. Because the three sector-shaped walls 54–56 subtended arcs slightly in excess of 90°, 15° and 15°, respectively, their lowermost edges overlap the top edges of the hopper portion walls, as shown, thereby insuring the desired flow of solids.

To change the flow into a different group of three discharge channels the previously projected pin 70 is retracted and another one is projected by manipulation of the levers 93–96 and the lever 88 is moved to raise the splitter just long enough to effect rotation thereof. The splitter comes to rest in its new orientation during the first revolution after it is lowered.

It is evident that the invention is not restricted to the specific construction or the above-described mode of operation, and that certain modifications and simplifications may in some instances be adopted without departing from the spirit and scope of the invention as defined in the appended claims. For example, it is possible to hold the splitter stationary under all three of the above-described distributions, and not only in the third. Additional latch-pins would in this case be provided. For example, when the splitter is held in the stationary position indicated in Figure 8, with the ridge 57 directly above one of the hopper partition walls, e.g., the wall 11 between the hoppers B and C, each of the hoppers receives one-fourth of the flow as follows:

The hoppers A and D receive solids delivered from the distributor outlet 47 whenever the latter is above the hoppers, since any solids falling onto the walls 55 and 56 slide down and are deflected somewhat but not diverted into an adjacent hopper. Similarly, the hoppers B and C receive all solids falling while the outlet 47 is above them, since solids falling onto the wall 54b (about one-eighth of the total flow) slide in a clockwise direction into the hopper B while solids falling onto the wall part 54a slide in the opposite direction into the hopper C; these solids are combined with the solids which enter the hoppers B and C directly, in the open sectors thereof, so that each of these hoppers receives one-fourth of the total flow.

The invention may also be applied to apparatus having more or less than four hoppers. For example, as is shown in Figure 9, there are three hoppers E, F and G, each occupying a 120° sector about the central vertical axis and separated by vertical radial partition walls 105, 106 and 107. The splitter drum 108 has a single, sector-shaped wall 109, including two parts 109a and 109b, each having a sector-shaped projected area slightly wider than 60° and sloping downward in opposite circumferential directions from a ridge 110 which is shown to be positioned directly above the wall 105. It is evident that this splitter provides two channels. When the splitter is stationary in the position shown solids are distributed equally among the three hoppers as the distributor outlet 47 passes at uniform speed along a circular path successively over the several hoppers. When the splitter is positioned with the ridge 110 above the median radius of one of the hoppers, so that one hopper is fully covered by the wall 109, that hopper becomes inactive and the solids are divided equally between the two active hoppers.

In the embodiment shown in Figure 10, there are six hoppers H–M, each occupying a 60° sector about the central vertical axis and separated by vertical, radial partition walls 111–116. The splitter drum 117 has five sector-shaped walls 118–122 as follows: The wall 118 includes two parts 118a and 118b, each having a sector-shaped projected area slightly wider than 30° and sloping downwards from a ridge 23, which is shown to be positioned directly above the wall 111. The walls 119 and 122 have their highest edges 124 and 125 displaced 72° in counterclockwise and clockwise directions, respectively, from the ridge 123 and these walls occupy sectors slightly greater than 18° and the walls 120 and 121 have their highest edges 126 and 127 displaced 144° in counterclockwise and clockwise directions, respectively, from the said ridge and these walls occupy sectors slightly in excess of 6°. When the splitter is stationary in the position shown solids are distributed equally among the six hoppers as the distributor outlet 47 traverses the successive sectors at uniform speed. When the splitter is positioned with the ridge 123 directly over the median radius of one of the hoppers so that the wall 118 covers it, that hopper becomes inactive and the solids are divided equally among the other five hoppers; each hopper then receives solids falling onto a 72° sector.

The splitters of Figures 8, 9 and 10 may, of course, also be rotated continuously with the distributor in the manner described for the first embodiment to effect uniform distribution of solids among all of the hoppers.

The above changes in the discharge flows can be made rapidly and without interrupting the supply of solids from the chute 39.

I claim as my invention:

1. Apparatus for splitting a feed stream of granular solids into a plurality of discharge streams comprising: a plurality of at least three hoppers having upwardly open inlets arranged about a vertical axis; distributor means situated above the hopper inlets for receiving said feed stream and discharging it progressively along an annular path about said axis; splitter means situated between the distributor and the hoppers in solids-receiving relation to the distributor means, said splitter means comprising a wall structure which is rotatable about said axis and provides a plurality of channels less than the number of hoppers, said channels being disposed for splitting the stream of solids into aliquot parts and discharging the resultant streams into a plurality of said hoppers; and a separate outlet for each hopper.

2. Apparatus according to claim 1 including means for locking said splitter structure in a selected angular relation to the hopper inlets, the channels being oriented so that at least one hopper inlet is covered by the wall structure to render that hopper inactive.

3. Apparatus according to claim 1 wherein at least one pair of adjacent hoppers has a movable partition wall dividing the corresponding hopper inlets, said partition wall being movable to deflect the solids directed from the splitter into both hoppers wholly into one of the hoppers.

4. Apparatus for dividing a feed stream of granular solids proportionally into a plurality of discharge streams comprising: a distributor adapted to receive said feed stream and mounted for rotation about an upright axis, said distributor having a bottom outlet situated eccentrically to said axis; means for continuously rotating said distributor; a splitter mounted in solids-receiving relation to said distributor and including a wall structure which provides a plurality of separate channels distributed circumferentially about said axis and having individual inlets and outlets, said channel outlets extending collectively over only a part of a circle less than the extent of the channel inlets to discharge the solids as restricted streams; a plurality of hoppers beneath said channel outlets, each hopper being disposed to receive solids from a fraction of said channel outlets, and the splitter and hoppers being relatively adjustable to change the hoppers into which particular channel outlets discharge solids; and a separate outlet for each hopper.

5. Apparatus according to claim 4 wherein the number of said channels is less than the number of hoppers and at least one pair of said channel outlets are spaced apart a distance at least as great as the width of one hopper, whereby the splitter can be positioned to prevent flow of solids into a selected hopper.

6. Apparatus according to claim 5 wherein the number of hoppers exceeds by one the number of splitter channels, said inlets to the splitter channels extend over zones of equal widths to receive equal amounts of solids from the distributor, and said outlets of the splitter channels extend over smaller, equal widths to deliver solids in equal amounts to all but one of said hoppers.

7. Apparatus according to claim 5 wherein said wall structure of the splitter includes a plurality of walls extending radially outward from said axis and inclined in circumferential directions.

8. Apparatus according to claim 7 wherein one of said inclined walls comprises portions sloping downwards in opposite circumferential directions from a ridge marking the boundary between a pair adjacent channel inlets.

9. Apparatus according to claim 4 wherein said splitter is mounted for rotation about said axis, in combination with means for selectively rotating the splitter continuously and for locking it in a selected, stationary position.

10. Apparatus according to claim 9 wherein the means for rotating the splitter includes coupling means for driving the splitter for rotation together with the distributor.

11. Apparatus according to claim 10 wherein the splitter is mounted for vertical reciprocation and the said coupling means are arranged to engage the splitter drivingly to the distributor in one vertical position of the splitter and for disengaging it in another vertical position, said locking means including a stop on the splitter and reciprocable pins mounted at fixed locations about the periphery for engagement with the stop.

12. In combination with the apparatus according to claim 11, a fluid pressure-actuated motor for each said pin connected to extend and retract the corresponding pin, a source of fluid under pressure, and valve means interconnected between said source and each motor controlling the flow of fluid individually to and from each motor.

13. In combination with the apparatus according to claim 11, a fluid pressure-actuated motor having an operating rod, a linkage connecting said rod to the splitter for raising and lowering the splitter in accordance with the movements of said rod, a source of fluid under pressure, and valve means interconnected between said source and the motor for controlling the flow of fluid to and from said motor.

14. Apparatus according to claim 4 wherein at least one pair of adjacent hoppers is provided with a movable partition wall separating the hoppers, said wall being movable to deflect the total flow of solids from the splitter toward said two hoppres into one of the said hoppers.

15. Apparatus according to claim 14 wherein said movable partition wall is mounted for swinging motion about a lower part thereof into any of three positions, of which the first position is substantially vertical to cause entry of solids into both hoppers, the second position is inclined over the first hopper to deflect solids into the second hopper, and the third position is inclined over the second hopper to deflect solids into the first hopper.

16. Apparatus for dividing a feed stream of granular solids proportionally into a plurality of discharge streams comprising: a distributor adapted to receive said feed stream and mounted for rotation about an upright axis, said distributor having a bottom outlet situated eccentrically to said axis; means for continuously rotating said distributor; a splitter mounted beneath said distributor and including a wall structure which provides a plurality of separate gravity-flow channels distributed about said axis and having individual top inlets and bottom outlets, said inlets extending over sectors of equal widths and collectively throughout a full circle to receive all the solids from said distributor by entry successively into the several channel inlets and said outlets extending collectively over only a part of a circle to discharge the solids as sectorially restricted streams; a plurality of hoppers arranged about said axis beneath said splitter outlets, each hopper being disposed to receive solids from a fraction of said outlets, and the splitter being rotatable to alter the orientation thereof with respect to the hoppers and thereby to change the hoppers into which particular splitter channel outlets discharge solids; and a separate outlet for each hopper.

17. Apparatus according to claim 16 wherein the number of hoppers exceeds by one the number of splitter channels and the outlets of said channels are situated to deliver solids respectively into different corresponding hoppers, whereby each hopper except one receives an aliquot part of the feed stream.

18. Apparatus for dividing a feed stream of granular solids selectively into two, three or four equal streams through a group of discharge ducts selected from four such ducts, comprising: a distributor adapted to receive said feed stream and mounted for rotation about an upright axis, said distributor having a sectorially restricted bottom outlet situated eccentrically to said axis; means for continuously rotating said distributor; a splitter beneath said distributor and including a drum mounted for rotation about said axis and three circumferentially inclined walls extending to said drum, each said inclined wall having a substantially sector-shaped projected area, one of said walls extending over at least one quadrant but less than 240° and including two equal wall parts sloping away from a ridge in opposite circumferential directions and the other two walls extending over sectors having widths of at least 15° but less than 60° and having their highest parts disposed nearest said first wall and displaced 120° from said ridge, said drum being open at the bottom to provide outlets for solids delivered from said distributor outlet onto the splitter; four hoppers having open top inlets occupying equal quadrants about said axis disposed beneath said splitter to receive solids from said splitter outlets, at least one pair of adjacent hoppers having between them a movable partition wall mounted for movement between three positions of which the first position is upright with the upper edge of the partition wall defining the boundary between hopper inlets such that said inlets are of equal size, and the other two positions are inclined respectively over the first and the second of said hoppers to deflect solids into a selected hopper; means for securing said splitter in an adjusted orientation with said first wall thereof covering completely any one of said hopper inlets; and a separate discharge duct for each of said hoppers.

19. Apparatus according to claim 18 including means for continuously rotating said splitter in synchronization with said distributor.

References Cited in the file of this patent

UNITED STATES PATENTS

| | | |
|---|---|---|
| 952,134 | Noxon | Mar. 15, 1910 |
| 2,547,794 | Stone | Apr. 3, 1951 |

FOREIGN PATENTS

| | | |
|---|---|---|
| 765,024 | Great Britain | Jan. 2, 1957 |